United States Patent [19]

Miller

[11] Patent Number: 4,794,575

[45] Date of Patent: Dec. 27, 1988

[54] SUBMARINE LAUNCHED SEA-STATE BUOY (SLSSB)

[75] Inventor: James E. Miller, Middletown, R.I.

[73] Assignee: The United States of America as represented by the Secretary of the Navy, Washington, D.C.

[21] Appl. No.: 104,210

[22] Filed: Oct. 2, 1987

[51] Int. Cl.[4] .......... H04B 11/00

[52] U.S. Cl. .......... 367/134; 367/4; 73/170 A

[58] Field of Search .......... 367/2–4, 367/133, 134; 73/170 A; 441/1, 8, 26; 114/326, 328

[56] References Cited

U.S. PATENT DOCUMENTS

| | | | |
|---|---|---|---|
| 3,983,750 | 10/1976 | Kirkland | 73/170 A |
| 4,107,804 | 8/1978 | Bennett | 367/4 |
| 4,203,109 | 5/1980 | Ballard et al. | 367/4 |
| 4,220,044 | 9/1980 | LeBlanc et al. | 73/170 A |

*Primary Examiner*—Thomas H. Tarcza
*Assistant Examiner*—Daniel T. Pihulic
*Attorney, Agent, or Firm*—Michael J. McGowan; Arthur A. McGill; Prithvi C. Lall

[57] ABSTRACT

A self-contained, expendable sea-state measuring device which deeply submerged submarines can launch in order to determine sea surface conditions prior to a missle launch. The device comprises a multi-chambered, buoyant cylindrical metal shell which houses a sea-state measuring instrumentation package, a moment correcting counterwieght, a long data downlink with spooling means and a bouyant lifting body which "flies" the data wire away from the launch platform. The buoy is launched from the submarine via the aft signal ejector, buoyantly ascends to the surface, and then transmits sea surface information back to the submarine via the data link.

6 Claims, 3 Drawing Sheets

SUBMARINE LAUNCHED SEA-STATE BUOY (SLSSB)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention reaates to wave parameter measurement devices and more particularly to a device for determining real-time, ocean surface, sea-state conditions from a submersible platform operating at substantial depth.

(2) Description of the Prior Art

The unique problems associated with measurement of surface wave characteristics from beneath the ocean surface by a submerged submarine has received little attention to date. There is, however, great interest in measuring such surface wave conditions due to the profound effect that surface waves have, not only upon the decision to launch submarine missiles, but also upon potential destabilization of the launching submarine itself. During submarine at-sea exercises, missile failures have occurred which were later directly attributed to the adverse effects of extant surface wind and wave conditions. Such conditions exceeded missile design limits producing structural damage to missile control surfaces during buoyant ascent to the surface. The ensuing disruption of the underwater missile trajectory resulted in the missile's inability to achieve stable flight trajectory and hence in flight failure. Furthermore, it has been bserved that large surface waves can cause severe roll and pitch of the submarine itself which may also impede launch operations from shallower depths.

Due to these deleterious surface wave effects on both missile and launch platform, a principle criteria currently used to arrive at a submarine missile launch decision is the maximum sea-state design limit of the missile in relation to sea surface conditions present at time of launch. Surprisingly though, there is a general lack of agreement about, or even understanding, as to what this sea-state design limit means and specifically how it translates into dynamic effects on the weapon. More importantly, no objective and consistently reliable means of accurately measuring sea-state has been provided to submarines which are nevertheless required to launch sea state limited missiles. The submarine commander is left to make critical sea-state estimates using either or both of the only two methods presently available to him. These methods comprise either periscope observations of short duration made by the launching submarine or second party observation reports received via communications link. Periscope observations have disadvantages in that they require the submarine to be at near surface depth and also require a subjective "eyeball" estimate by an observer. At-sea exercises have repeatedly demonstrated the inaccuracies of such estimates. Second party reports also have serious disadvantages in that they not only require proximity of the submarine to the surface but also are generally not of a timely nature. These reports provide only recently observed conditions over a broad geographical area vice exact conditions present in the local operational area at the intended moment of launch. In addition, both of these methods adversely impact the tactical security of the submarine in requiring that it come to periscope depth thus providing an undesirable detection opportunity for an adversary.

To date, efforts to improve the ability of a deeply submerged submarine to remotely assess sea surface wave height conditions have been limited to the development of indirect acoustic monitoring techniques. These techniques seek to correlate wind created surface conditions with ambient acoustic noise levels generated by these surface conditions and received by onboard sonar systems, and ultimately with wave height. While this approach shows some promise, it will require collection of extensive amounts of acoustic data and it will be a long time, if ever, before thi approach yields results which can be routinely and consistently relied upon by operational fleet submarines.

SUMMARY OF THE INVENTION

Accordingly, it is a general purpose and object of the present invention to provide a submerged submarine with a direct means of measuring sea surface wave conditions without interfering with normal operations or tactical security. It is a further object to provide this capability without requiring changes to any existing submarine equipment or systems other than the additional storage space required for the SLSSB units and an associated data readout unit. Another object is that the invention conform to the physical size constraints and operational characteristics of existing signal ejector launched devices. Still another object is to use hardware and deployment techniques already proven reliable. Still another object is that ship operational limits for deployment and use of the SLSSB be comparable to those for present expendable bathythermographs. A still further object is that uoon mission completion, the SLSSB scuttle itself.

These objects are accomplished with the present invention by providing a self-contained, expendable sea-state measuring device which deeply submerged submarines can launch in order to remotely dttermine sea surface conditions prior to a missile launch decision. The device comprises a multi-chambered, buoyant, cylindrical metal shell which houses a sea-state measuring instrumentation package, a moment correcting counterweight, a long data downlink with spooling means and a buoyant lifting body which "flies" the data wire away from the launch platform. The buoy is launched from the submarine via the existing aft signal ejector, buoyantly ascends to the surface, and then transmits sea surface information back to the submarine via the data link for a predetermined period of time. Sea water dissolving plugs provide a timed means of scuttling upon completion of SLSSB data gathering.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF PREFERRED EMBODIMENT

Figure 1:
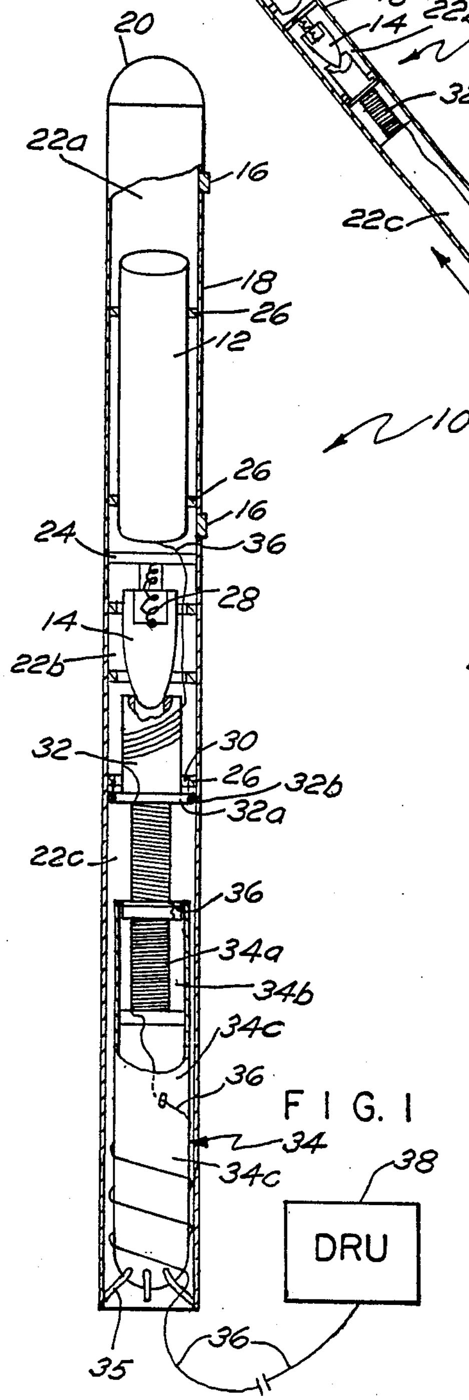
FIG. 1 shows a cut-away view of a submarine launched sea state buoy (SLSSB) according to the present invention.

Referring now to FIG. 1 there is shown a means for directly measuring sea surface wave characteristics by utilizing an expendable, submarine launched sea state buoy (SLSSB) 10 further including an acceleoometer based instrumentation package 12. Subsequent processing and analysis of the accelerometer produced data onboard the submarine yields real-time wave height information. The device is of similar size to, and is launched in the same manner as, existing Submarine Expendable Bathythermographs (SSXBT) which are used to measure the sound velocity profile of deep ocean waters.

The complex nature of ocean wave motion and the dynamic forces associated with such motion preclude the use of a simple scalar quantity, such as sea-state number, in adequately describing it. Through the use of fourier analysis and some simplifying sssumptions, however, a more useful power spectral density parameter may be developed for describing the energy associated with a wave field. Various standard texts, such as Papoulis, Athanasios, *The Fourier Integral and Its Applications,* New York: McGraw-Hill, 1962 and Wylie, Jr., C. R., *Advanced Engineering Mathematics,* 2nd ed. New York: McGraw-Hill, 1960, pp. 245–288, discuss fourier analysis and the development of power spectra for periodic functions.

In examining an ocean wave field, however, two problems become immediately obvious. One is that ocean waves are not periodic-they are random. The second is that the collection of wave data is time limited, that is, wave measurements can only be made for a finite time period. LeBlanc, Middleton, and Milligan address this issue in Lellanc, Lester R., Middleton, Foster B. and Milligan, Stephen D, *Analysis and Interpretation of Wave Spectral Data,* Seventh Annual Offshore Technology Conference, May 5–8, 1975, Dallas, Tex., 1975 and have demonstrated a fast fourier transform technique in which the length of a wave amplitude record segment is assumed to be the period in a standard fourier series expansion. A fast fourier transform derived spectrum is then calculated for the segment of wave amplitude data and a statistical "final spectrum" is obtained by averaging many spectra from several data segments. A variation of this technique has been developed as microcomputer software by ENDECO, Inc. and is used in the analysis of wave data in their large commercially available Typ 956 Directional WAVE-TRACK Buoy System. The SLSSB system uses a modified version of such ENDECO analysis software onboard the submarine for processing the output data from sea state buoy 10. The modified software includes a predetermined spectral compensation function which accounts for unique physical characteristics and responses of buoy 10. This "impulse response" transform function is then applied to the recorded accelerometer data to yield wave displacement and the desired power spectral density of the driving waves.

In order to launch SLSSB 10 from existing submarine signal ejector systems, buoy 10 is made to conform to the physical and general operational characteristics of present submarine signal ejector launched devices so as to avoid costly modifications to the ship or the signal ejector system. The SLSSB 10 also uses commercially available components in order to be low in cost and hence expendable.

SLSSB 10 provides a submarine with a self-contained, expendable device which is launched in order to determine sea surface wave conditions prior to a missile launch decision. The device illustrated in FIG. 1 utilizes several components from present SSXBT systems in combination with additional unique components which further include instrumentation package 12, a tethered motion dampening mass 14, and sea water dissolving plugs 16. SLSSB 10 comprises a long, thin walled, cylindrical metal body 18 having the top or proximal end thereof sealably attached to a rounded nose plug 20 while the bottom or distal end, which is stored with a removable protective cap (not shown), remains open. The internal volume of body 18 is subdivided by a circular disk-shaped metal bulkhead 24 fixedly attached around its periphery to the internal wall of body 18, and is reinforced by a plurality of annular metal strengthening rings 26. Bulkhead 24 is spaced a preselected distance from nose plug 20 and, in cooperation with the wall of body 18 and nose plug 20, forms a first hermetically sealed forward chamber 22*a* in which instrumentation package 12 is mounted. Package 12 includes a high output linear accelerometer such as a SETRA, Inc. Model 141A or the like which is gimbal mounted within a sealed casing of plastic. The gimbal mounting means keeps the accelerometer sensing axis generally parallel to the vertical plane of wave motion up to pitch angles of 45 degrees. A plurality of dissolving plugs 16 sealably fill corresponding apertures which pass through the thin wall of body 18 into chamber 22*a.* Motion dampening mass 14 is releasably attached, by tether 28, to the bottom side of bulkhead 24 and extends generally downward toward the open end of body 18. Each passing wave produces oscillatory vertical and orbital pitching motion of SLSSB 10. Mass 14 produces both drag, which dampens vertical motion, and a righting moment, which dampens pitch. Dampened vertical motion reduces SLSSB response to high frequency waves which do not greatly affect launching of large mass submarine missiles. It is very low frequency waves which produce most of the potentially damaging wave energy. Dampened pitch decreases accelerometer output error by reducing the duration and the magnitude of misalignment between the accelerometer sensing axis and the vertical plane of wave motion. Bottom ring 26 has aperture 30 therethrough which permits dampening means 14 to descend down and out of body 18.

Intermediate cylindrical spool member 32 has a circular flange 32*a* formed midway thereabout, which divides spool member 32 into two spool-like ends. Flange 32*a* seats against the lip formed by bottom ring 26 and aperture 30. An "o" ring 32*b* is disposed around the periphery of flange 32*a,* which seal flange and ring juxtaposition thereby forms a second hermetically sealed chamber 22*b.* A lifting body 34 is seated in third chamber 22*c,* body 34 having a spool end 34*a* in its top hollow end 34*b,* spool end 34*a* being in contact with the lower spool end of intermediate spool 32. The upper end of spool 32 is in contact with and supports mass 14, the entire stacked sequence of mass 14, spool 32 and body 34 being held in place by a plurality of flexible recessed spring "fingers" 35 pressing upward against the rounded lower and 34*c* of body 34. A data link 36, which may be wire or optical fiber, attaches to instrument package 12 at one end, passes through bulkhead 24, wraps around the top and bottom ends of intermediate spool 32, then around spool end 34a and over hollow end 34c on lifting body 34 before passing out of body 18 and eventually connecting to data readout unit (DRU) 38 located on board the launching submarine. The DRU accepts data in digital form from SLSSB 10, signal processes the data, and provides an output to the SLSSB system operator representative of the real-time surface wave height profile. DRU 38 comprises a central processing unit which is software programmed to store and statistically manipulate SLSSB 10 gathered data.

The preferred embodiment of this invention may be best understood by a description of its operational deployment sequence which occurs in four basic phases, i. e., deployment, ascent, data collection, and scuttling, as illustrated sequentially in FIGS. 2–5.

Figure 2:
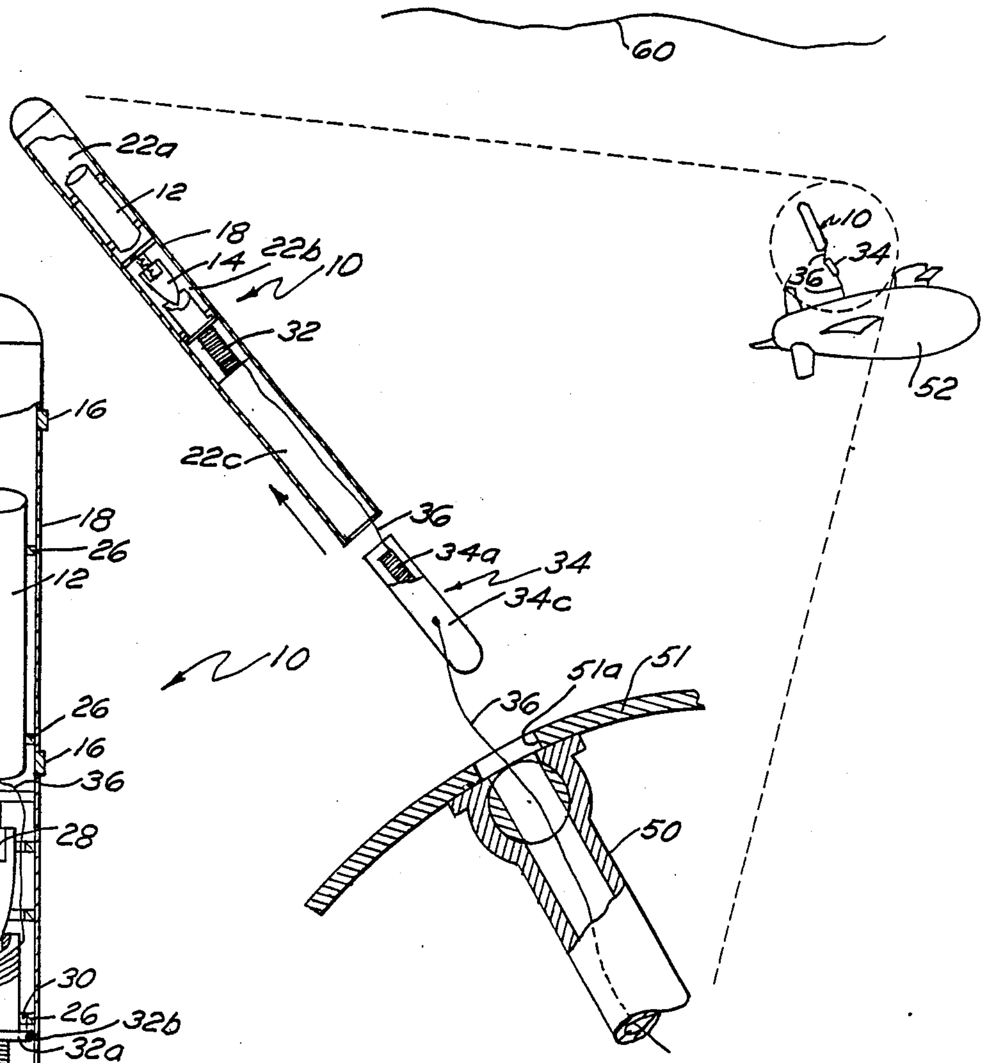
FIGS. 2–5 show the operational sequence of a typical SLSSB deployment.

The deployment phase shown in FIG. 2 begins with a requirement to launch an SLSSB. SLSSB 10 is loaded into the aft submarine signal ejector 50, whcch is fixedly attached to the hull 51 of submarine 52 at a circular aperture 51a. The end of data wire 36 passes inboard to the submarine interior through a signal ejector 50 breech door gland nut (not shown) and is there connected to an input terminal on DRU 38. Upon SLSSB 10 ejection, data wire 36 unspools from around the exterior surface of end 34c of lifting body 34. When taut, data wire 36 then pulls lifting body 34 from chamber 22c. Sea pressure in chamber 22c at the aft end of SLSSB body 18 holds intermediate spool 32 in place against bottom ring 26 thus trapping an air pocket in chamber 22b above it. The air in chambers 22a and 22b make body 18 positively buoyant.

Figures 3, 4:
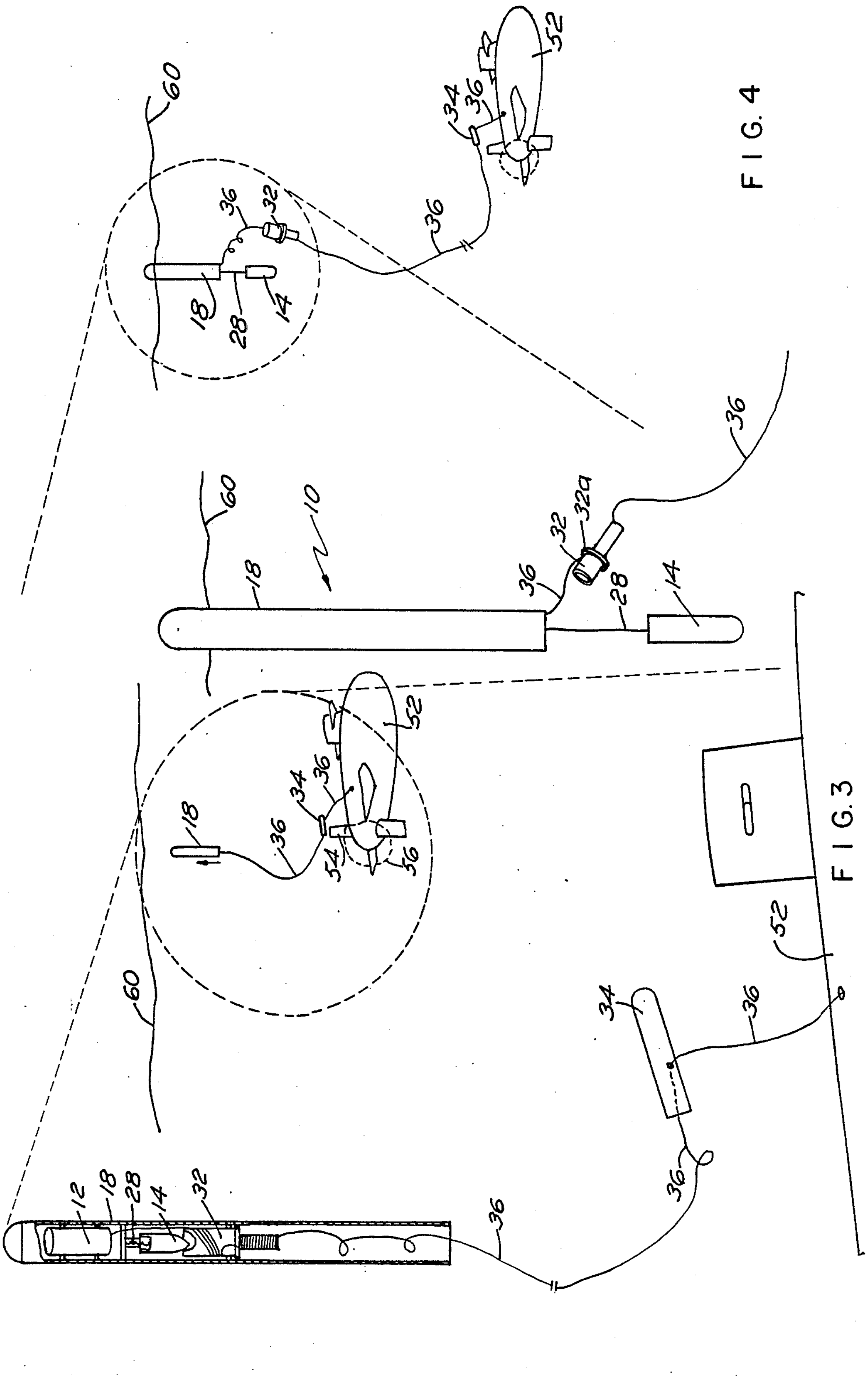

During the ascent phase shown in FIG. 3, positively buoyant SLSSB body 18 begin to move upwards toward ocean surface 60. Meanwhile, lifting body 34 is being pulled along by forward moving submarine 52 and "flies" above the submarine rudder 54 and screw 56. Simultaneously, data wire 36 is being unspooled from both lifting body spool 34a, and intermediate spool 32 which is still held in place by sea pressure within SLSSB body 18. This simultaneous unspooling of data wire 36 from spools 32 and 34a prevents SLSSB body 18 from being dragged behind submarine 52.

The data collection phase, FIG. 4, begins with the SLSSB body 18 reaching surface 60. At the surface, the decrease in sea pressure permits release of intermediate spool 32 and tethered motion dampening mass 14 which then both fall from SLSSB body 18. Motion dampening mass 14 is restrained by tether 28 at least 1 meter below ocean surface 60 to provide a stabilized righting moment for SLSSB body 18 in order to reduce the effects of pitch on the buoy. At the same time, data wire 36 continues to unspool from intermediate spool 32 and lifting body spool 34a. As SLSSB body 18 rises and falls with the waves, instrumentation package 12 transmits wave-heave data back to submarine 52 and DRU 38 via data wire 36. Meanwhile, since ejection, dissolving plugs 16 have been dissolving in the sea water. In the preferred embodiment the preselected rate at which they dissolve allows approximately five to ten minutes of data collection but this time may be varied as desired.

Figure 5:
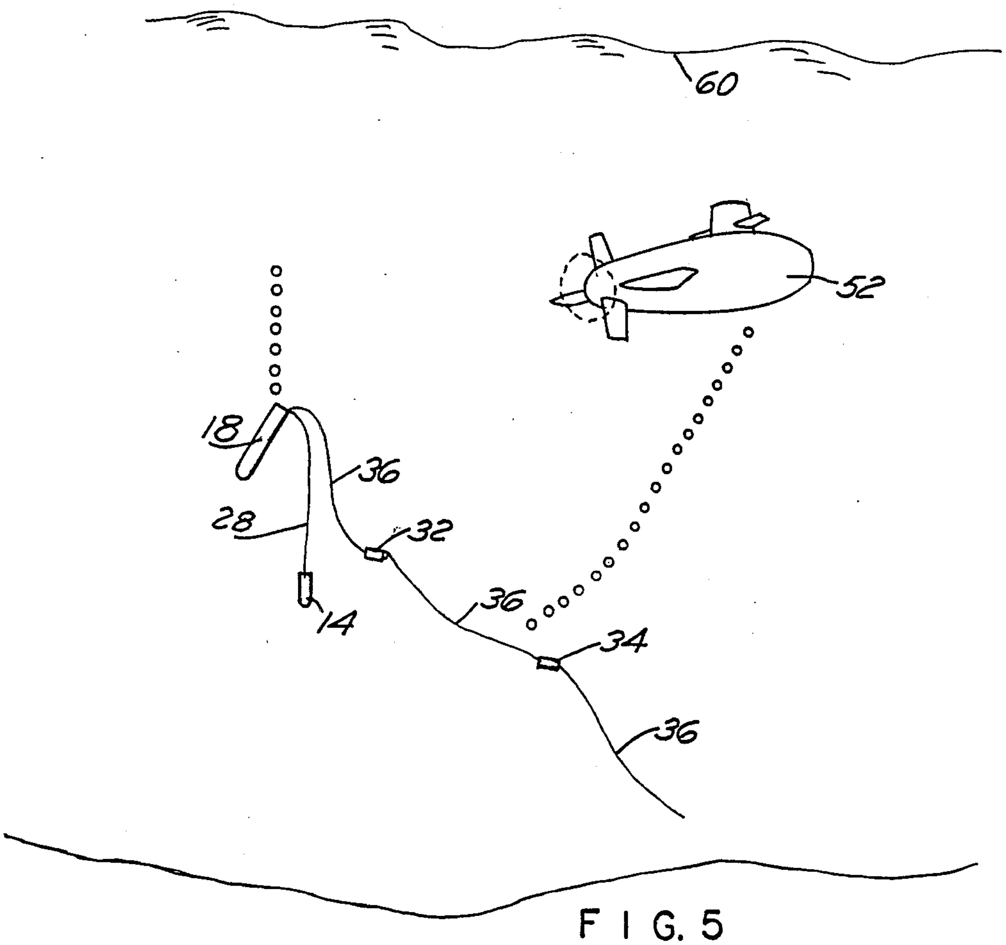

The final scuttling phase shown in FIG. 5, begins when dissolving plugs 16 have been sufficiently eaten away by sea water to provide a through hole whereupon SLSSB body 18 fills with water and begins to sink. At this point, DRU 38 senses and indicates to the system operator that constant downward acceleration is present at which time the operator activates a wire shear mechanism (not shown) on signal ejector 50. The signal ejector is then secured and DRU 38 queried for the sea-state data.

Figure 6:
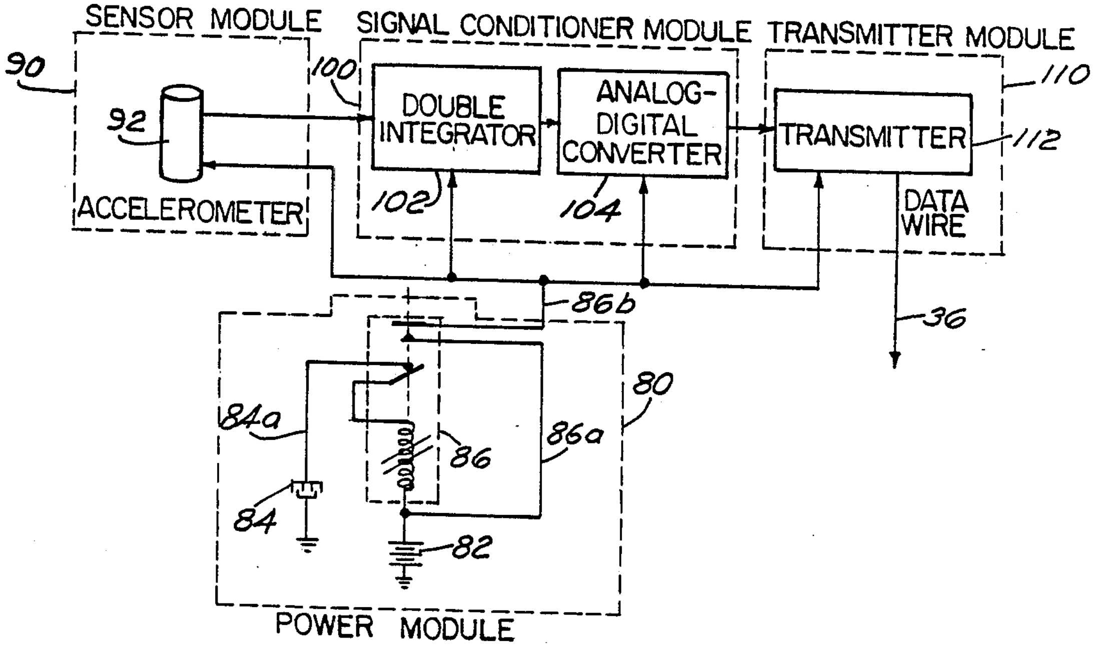
FIG. 6 shows a schematic diagram of the instrumentation package of the device of FIG. 1.

Instrumentation package 12 of SLSSB 10 is the critical component which measures and transmits wave data back to submarine 52. Package 12 comprises four major modules which are shown schematically in FIG. 6. Power module 80 supplies 9 Volt DC electrical power for operation of the remaining modules. Module 80 further comprises a 9 volt battery 82, a wet probe 84, and a latching control relay arrangement generally identified as 86. All power circuits remain de-energized until SLSSB 10 is immersed in sea water. Upon immersion, wet probe 84, via connecting wire 84a, completes the activation circuit for control relay 86 thereby breaking activation loop 84 while simultaneously closing the path between wires 86a and 86b thereby applying power to modules 90, 100 and 110. Control relay 86 is a latching relay such that once latched, its contacts remain positioned to allow transmission of power to the other modules while preventing a direct short of the battery to ground through wet probe 84. Sensor module 90 includes an accelerometer 92 whose sensing axis is aligned along the generally vertical longitudinal axis of SLSSB 10. The input to module 90 is the steady voltage from power module 80 and the output is a varying voltage which is directly proportional to the acceleration sensed due to vertical wave motion. The module 90 output is then supplied to signal conditioner module 100 which converts the output of sensor module 90 into a useful buoy displacement signal, and also transforms the output from analog to digital form in preparation for transmission back to the submarine. Module 100 comprises double integration circuitry 102 to convert acceleration to displacement and an analog-to-digital converter 104. A transmitter module 110 amplifies and transmits the now digitized displacement signal data back to DRU 38 on the submarine. Module 110 includes transmitter circuitry 112 as well as the data link wire 36 on its associated spools.

SLSSB 10 represents a novel approach for submarine sea surface monitoring which provides significant advantages over the prior art methods. First, it allows the submarine to measure sea-state conditions without losing tactical security. Second, it allows the submarine to monitor sea-state while at operational depths. Third, it allows collection of real-time sea-state data which is pertinent to the local operational area. And fourth, it allows the collection of objective, quantitative data which is not tainted by observer estimate errors.

What has thus been described is a self-contained, expendable device which submerged submarines launch to determine sea surface conditions prior to a missile launch. The device comprises a multi-chambered, buoyant cylindrical shell which houses a sea-state measuring instrumentation package, a moment correcting counterweight, data wire and spooling means, and a buoyant lifting body which "flies" the data wire away from the launch platform. The buoy is launched from the submarine via the aft signal ejector, buoyantly ascends to the surface, and then transmits sea surface data back to the submarine via a data link.

Obviously many modifications and variations of the present invention may become apparent in light of the above teachings. For example: The down link wire may be an optical fiber in lieu of electrical wire. A radio transmitter may be used to up link sea-state data to surface ships or aircraft. The shape of moment stabilizing mass 14 and the length of tether 28 or the mode of its deployment may be varied to suit anticipated operational conditions. Signal processing software and seastate math models may also be modified to assure maximum accuracy.

In light of the above, it is therefore understood that within the scope of the appended claims, the invention may be practiced otherwise than as specifically described.

What is claimed is:

1. A sensing device, launched from a submarine submerged under the surface of an ocean, buoyantly ascending to said surface and floating thereon, for remotely measuring surface wave characteristics, comprising:

a long cylindrical body having a forward end, an aft end, a hermeticaly sealed chamber located at the forward end thereof, a centrally located hermetically sealed intermediate chamber and an open ended chamber located at the aft end thereof, said long cylindrical body further comprising, a long cylindrical metal tube having first and second open ends and a plurality of apertures therethrough in proximity to said first tube end, a plurality of seawater dissolvable plugs, one each corresponding to each said plurality of apertures, for sealing said apertures, a rounded metal nose plug, fixedly attached to said first open end of said tube, for sealably closing said first end, a plurality of annular stiffening rings, disposed at preselected locations along the interior surface of said tube, for providing pressure resisting reinforcement to said tube, and a circular, disk shaped metal bulkhead, fixedly attached around the periphery thereof to the interior wall of said tube at a preselected location therealong, for providing, in cooperation with said nose plug and said plurality of dissolvable plugs, said hermetically sealed forward chamber;

instrumentation means, fixedly attached within said forward end chamber of said body, for responding to vertical wave produced accelerations, producing analog distance signals therefrom and converting said analog signals to digital electrical signals;

motion dampening means, movably positioned within said intermediate chamber and further affixed by tether thereto, for dampening vertical and pitchwise oscillations of and providing proper orientation to said body with respect to said sea surface;

intermediate spool means, slidably inserted within said body so as to contact said motion dampening means, for holding said motion dampening means within said body;

lifting body means, releasably positioned in the aft end chamber of said cylindrical body in contact with said intermediate spool means for exiting said open end and lifting clear of said submearine after launch;

data link means, connected to said instrumentation package, said intermediate spool means and said lifting body means, for transmitting said digital electrical signals from said instrumentation package to said submarine along said data link; and a data readout unit, located on said submarine, for receiving said digital signals and converting them into wave height information.

2. A sensing device according to claim 1 wherein said instrumentation means further comprises:

an acceleration sensing means, gimbal mounted so as to keep the axis thereof vertical with respect to said ocean surface, for producing analog acceleration signals;

a signal conditioning means, electrically connected to said acceleration sensing means, for receiving said analog acceleration signals, producing said analog distance signals therefrom and further producing said digital distance electrical signals from said analog distance signals;

a transmitting means, electrically connected to said signal conditioning means, for receiving said digital distance signals and transmitting said digital signals to said data link means; and power source means, electrically connected to said acceleration sensing means, said signal conditioning means and said transmitting means, for providing operating power thereto.

3. A sensing device according to claim 2 wherein said spool means further comprises:

a first spool end having a diameter substantially less than said tube inside diameter;

a second spool end, coaxial with said first spool end and having a diameter substantially less than said tube inside diameter;

a circular flange, formed between said first and second spool ends and having a diameter sized to slidably fit within said tube; and an 'o' ring, disposed around the periphery of said circular flange, for sealably filling the diametral space between said flange and said tube.

4. A sensing device according to claim 3 wherein said lifting body means further comprises:

a third spool end having a diameter substantially less than said tube inside diameter;

a rounded hollow lower end, opposite said third spool end; and a plurality of spring fingers, disposed about the inside periphery of said second end of said tube and resting against said rounded lower end of said lifting body means, for releasably holding said lifting body within said tube.

5. A sensing device according to claim 4 wherein said data link means is an electrical wire.

6. A sensing device according to claim 5 wherein said data readout unit further comprises:

a general purpose digital computer, and signal processing software program means, loaded into said computer, for processing said digital signals received over said data link and converting said digital signals to said wave height.

* * * * *